(12) United States Patent
Chan

(10) Patent No.: US 9,730,554 B2
(45) Date of Patent: Aug. 15, 2017

(54) DEVICE AND METHOD FOR AIRTIGHT STORAGE AND GRINDING OF HERBS

(71) Applicant: Erik Chan, Orange, CA (US)

(72) Inventor: Erik Chan, Orange, CA (US)

( * ) Notice: Subject to any disclaimer, the term of this patent is extended or adjusted under 35 U.S.C. 154(b) by 166 days.

(21) Appl. No.: 14/938,722

(22) Filed: Nov. 11, 2015

(65) Prior Publication Data

US 2016/0128513 A1    May 12, 2016

Related U.S. Application Data

(60) Provisional application No. 62/078,360, filed on Nov. 11, 2014.

(51) Int. Cl.
| *A47J 42/34* | (2006.01) |
| *B02C 18/08* | (2006.01) |
| *B65D 51/24* | (2006.01) |
| *A47J 43/04* | (2006.01) |

(52) U.S. Cl.
CPC .............. *A47J 42/34* (2013.01); *A47J 43/04* (2013.01); *B02C 18/08* (2013.01); *B65D 51/24* (2013.01)

(58) Field of Classification Search
CPC ........... A47J 43/04; A47J 42/34; B02C 18/08; B65D 51/24
USPC ....................................... 241/169.1
See application file for complete search history.

(56) References Cited

U.S. PATENT DOCUMENTS

| 7,422,170 | B2 * | 9/2008 | Bao | B02C 18/24 |
| | | | | 241/168 |
| 8,083,167 | B1 * | 12/2011 | Namakian | A47J 42/14 |
| | | | | 241/169.1 |
| 8,220,732 | B2 * | 7/2012 | Griffin | A47J 43/04 |
| | | | | 241/169.1 |
| 8,695,906 | B2 * | 4/2014 | Hainbach | A47J 42/14 |
| | | | | 241/169.1 |
| 8,733,679 | B2 * | 5/2014 | Camitta | B02C 18/16 |
| | | | | 241/169.1 |
| 9,241,597 | B2 * | 1/2016 | Dukat | A47J 42/14 |
| 9,332,879 | B1 * | 5/2016 | Bronson | A61M 15/06 |
| 9,427,020 | B2 * | 8/2016 | Ruzycky | A24C 5/02 |
| 2007/0262182 | A1 * | 11/2007 | de Groote | A47J 19/04 |
| | | | | 241/169.1 |
| 2011/0147505 | A1 * | 6/2011 | Griffin | A47J 43/04 |
| | | | | 241/68 |
| 2012/0097774 | A1 * | 4/2012 | Hainbach | A47J 42/14 |
| | | | | 241/101.2 |

(Continued)

*Primary Examiner* — Faye Francis
(74) *Attorney, Agent, or Firm* — Elizabeth Yang

(57) ABSTRACT

A storage and grinding device and method provides the dual functionality of forming an airtight compartment for storing herbs to protect their flavor and essence, and disassembling into a grinder to grind, tear, and shear the herbs. The device forms an airtight compartment with detachable lids that detach from the compartment and join together to form a unitary grinder, generally for grinding the contents of the compartment. A first and second lid form an airtight seal over each end of the compartment. The airtight seal is formed when the first and second lids form a hermetic seal at each end of the compartment. The airtight seal enhances the flavor and smell of the herbs by retaining the essence within the compartment and keeping the herbs impervious to gases. The first and second lids can disengage from each end of compartment, and engage each other to form a unitary grinder.

20 Claims, 3 Drawing Sheets

(56) References Cited

U.S. PATENT DOCUMENTS

2014/0217213 A1\* 8/2014 Edwards ................. A47J 42/40
                                                      241/69
2016/0106262 A1\* 4/2016 Mroue .................... A47J 42/26
                                                      241/79

\* cited by examiner

DEVICE AND METHOD FOR AIRTIGHT STORAGE AND GRINDING OF HERBS

CROSS REFERENCE OF RELATED APPLICATIONS

This application claims the benefits of U.S. provisional application No. 62/078,360 filed Nov. 11, 2014 and entitled Airtight Storage Compartment with Detachable Grinding Lids, which provisional application is incorporated by reference herein in its entirety.

FIELD OF THE INVENTION

The present invention relates generally to a grinding and storage device and method for airtight storage and grinding of herbs. More so, a storage and grinding device provides the dual functionality of forming an airtight compartment for storing herbs to protect their flavor and essence, and disassembling into a grinder to grind, tear, and shear the herbs airtight compartment; whereby the device includes detachable lids that form an airtight seal over the compartment, and also detach from the compartment to join together as a unitary grinder.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

It is known that an herb is a plant that is used for food, flavoring, medicine, or perfume. Generally, herbs refer to the leafy green parts of a plant. The herb may be either fresh or dried. Typically, there is a significant flavor difference between fresh herbs and commercially available dried herbs. Fresh herbs have a limited shelf life and thus the industry has attempted to extend the shelf life. The most successful commercial technique for extending the shelf life of herbs is by grinding and air-drying. Additionally, smoking herbs, including tobacco, require physically breaking them down into grinds.

In most instances, herbs are typically purchased in a non-ground state and stored in this manner. Moreover, a specific amount and quantity or dose may be required if the herb is used as medicine, or a particular amount may be desired for the intended purpose. Another example is the grinding of tobacco leaves in an amount desirable for rolling a cigarette or for placement in a pipe so as to be smoked. Typical spice grinders and the like do not allow one to take these factors into consideration.

Presently, such herbs are stored in a manner in which their strong and unique odor may escape from the container and into the area surrounding the stored herbs, such as filling one's automobile, room, etc. with the odor which may be undesirable. The desired amount of herb must be extracted from the storage container and then manually ground using other means or a completely separate grinder. This is not only inconvenient, but once again the unique and strong odor of the herb is not adequately contained in using the cutting and grinding mechanisms and methods currently available.

Generally, hand-held manual grinders are well known, and commonly used for grinding and storing solid spices, such as herbs, spices, and seeds. Typical grinders comprise a static element which has a central bore. The central bore can be used as a storage region, and also as an axis for grinding components.

In many of the devices, an array of teeth project inwardly from the surface of the bore. Within the bore there is a rotatable element which has radially outwardly projecting veins. Herbs or seeds are trapped between the veins and the teeth and ground into a powder when the rotatable element is turned. The powder then falls from the grinder.

Other proposals have involved storing and grinding herbs. The problem with these grinding devices is that they do not fully break down the herbs, and the odor of the herbs escapes from the storage portion. Also, the herbs must be removed from the storage portion and ground in a different device. Even though the above herb storage and grinding devices meet some of the needs of the market, a storage and grinding device that forms an airtight compartment for storing herbs to protect their flavor and essence, and also disassembles into a grinder to grind, tear, and shear the herbs is still desired.

SUMMARY OF THE INVENTION

Illustrative embodiments of the disclosure are generally directed to a device and method for airtight storage and grinding of herbs. The storage and grinding device is configured to provide the dual functionality of forming an airtight compartment for storing herbs to protect their flavor and essence, and disassembling into a grinder to grind, tear, and shear the herbs. The device forms an airtight compartment with detachable lids that detach from the compartment and join together to form a unitary grinder, generally for grinding the contents of the compartment.

The device includes a first and second lid form an airtight seal over each end of the compartment. The airtight seal is formed when the first and second lids form a hermetic seal at each end of the compartment. The airtight seal enhances the flavor and smell of the herbs by retaining the essence within the compartment and keeping the herbs impervious to gases. The first and second lids can disengage from each end of the compartment, and engage each other to form a unitary grinder.

One aspect of the combination storage and grinding device comprises:

a compartment defined by a first compartment end and a second compartment end from which extend compartment sidewalls defined by a compartment diameter, the compartment further defined by a cavity;

a first lid defined by a first interior portion and a first exterior portion, the first interior portion having a plurality of first grinding members, the first exterior portion having a first lid end from which extends a first lid sidewall, the first lid sidewall defined by a first lid diameter, the first lid diameter configured to be infinitesimally smaller or larger than the compartment diameter, the first lid disposed to detachably mate with the first compartment end, wherein an airtight seal forms between the compartment sidewalls and the first lid sidewall; and a second lid defined by a second interior portion and a second exterior portion, the second interior portion having a plurality of second grinding members, the second exterior portion having a second lid end from which extends a second lid sidewall, the second lid sidewall defined by a second lid diameter, the second lid diameter configured to be infinitesimally smaller or larger than the compartment diameter, the second lid disposed to detachably mate with the second compartment end, wherein an airtight seal forms between the compartment sidewalls and the first lid sidewall, the second lid further disposed to detachably mate with the first lid, wherein a compressive and rotational force applied to the first lid and/or the second lid generates a grinding action between the plurality of first grinding members and the plurality of second grinding members.

A second aspect provides of the method for airtight storage and grinding of herbs, comprises:

providing an herb;

positioning the herb in a compartment of a storage and grinding device;

fastening a first lid over a first compartment end of the compartment;

fastening a second lid over a second compartment end of the compartment;

creating an airtight seal in the compartment;

detaching the first lid from the first compartment end and the second lid from the second compartment end;

positioning the herb between a plurality of first grinding members in the first lid and a plurality of second grinding members in the second lid;

mating a first lid sidewall of the first lid with a second lid sidewall of the second lid; and applying compressive and rotational force to the first lid and the second lid, the compressive and rotational force configured to generate a grinding action between the plurality of first grinding members and the plurality of second grinding members.

In another aspect, the compartment has a generally cylindrical shape, an elongated tetrahedron, an elongated hexahedron, or an elongated 3D rectangle.

In another aspect the first lid and the second lid have generally cylindrical shapes.

In another aspect the plurality of first grinding members and the plurality of second grinding members have generally a conical shape, and/or a beveled shape, and/or a rectangular shape, and/or a diamond shape, and/or a confetti shape, and/or a frustoconical shape, and/or a frustoconical pentrahedral shape.

In another aspect the first lid diameter is configured to be infinitesimally smaller or larger than the second lid diameter for enabling a snug fit while mated.

In another aspect the first lid sidewall and the second lid sidewall are magnetized, wherein the attraction formed by the magnetization enables the creation of a snug fit as a compressive and rotational force is applied on the first lid and/or the second lid.

In another aspect the cavity of the compartment comprises at least one barrier for segregating contents therein.

In another aspect the barrier aligns along the length of the compartment.

In another aspect the barrier extends transversely across the compartment.

One objective of the present invention is to provide a dual purpose storage compartment for herbs that stores the herbs in an airtight compartment, and also detaches to form a unitary grinder from the lids on the compartment.

Another objective is to provide lids with grinding members that mate together for grinding, shredding, and defoliating herbs through a gentle compressive and rotational force.

Another objective is to magnetize the lids to create a snug fit between the lid sidewalls while grinding.

Another objective is to provide a multipurpose storage and grinding device that easily and detachably converts between a storage compartment and a grinder.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

Figure 1:
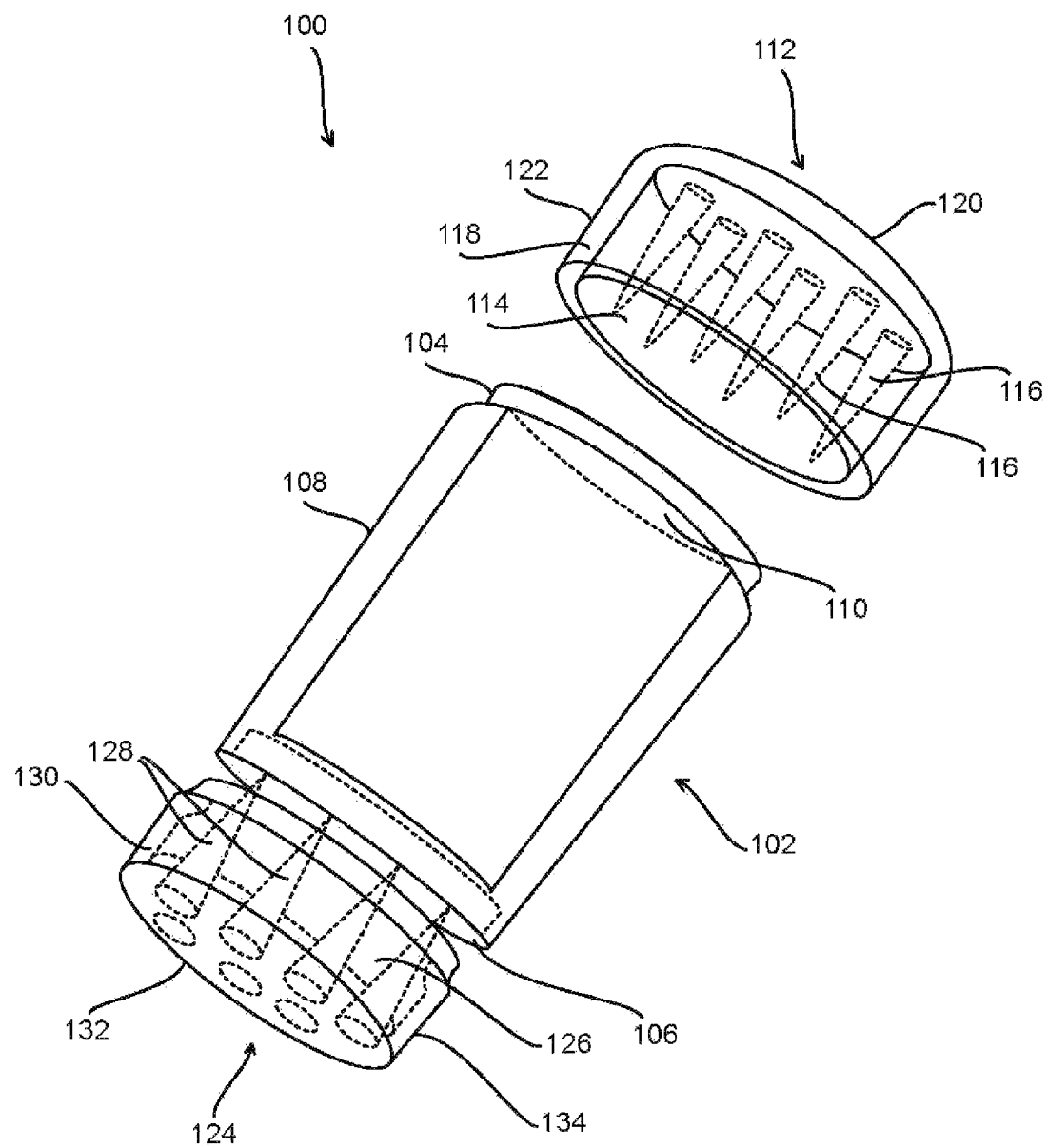
FIG. 1 illustrates a sectioned view of an exemplary compartment of a device for storage and grinding of herbs with detachable grinding lids, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "first," "second," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At the outset, it should be clearly understood that like reference numerals are intended to identify the same structural elements, portions, or surfaces consistently throughout the several drawing figures, as may be further described or explained by the entire written specification of which this detailed description is an integral part. The drawings are intended to be read together with the specification and are to be construed as a portion of the entire "written description" of this invention as required by 35 U.S.C. §112.

Figure 2:
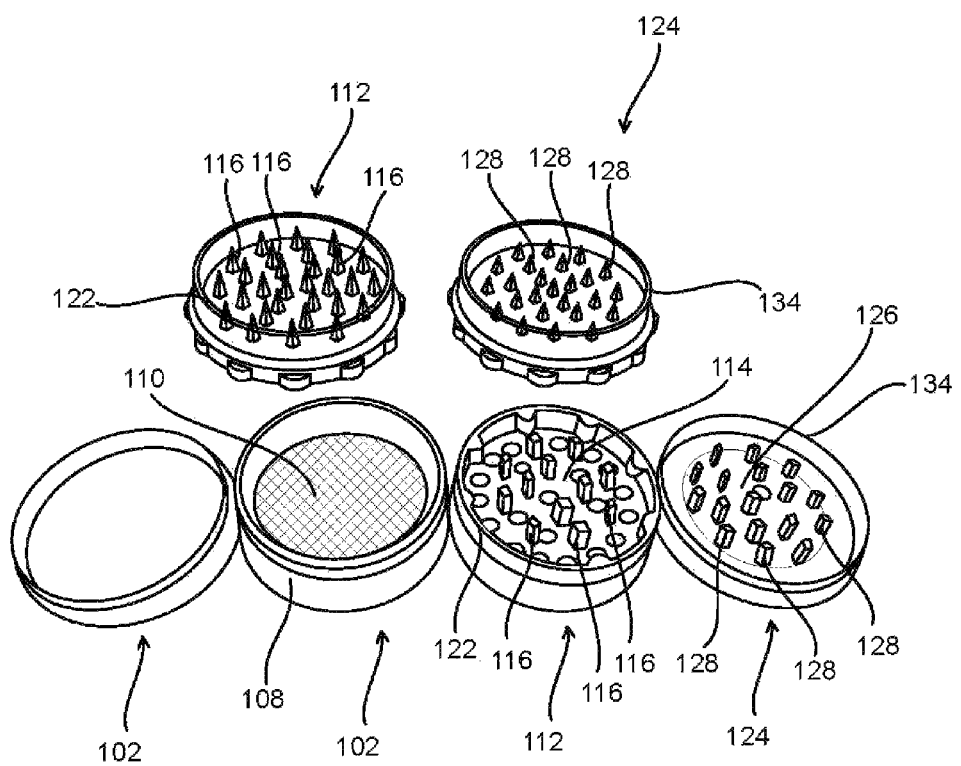
FIG. 2 illustrates a perspective view of various lids with different types of grinding members detached from the compartment, in accordance with an embodiment of the present invention.
Figure 3:
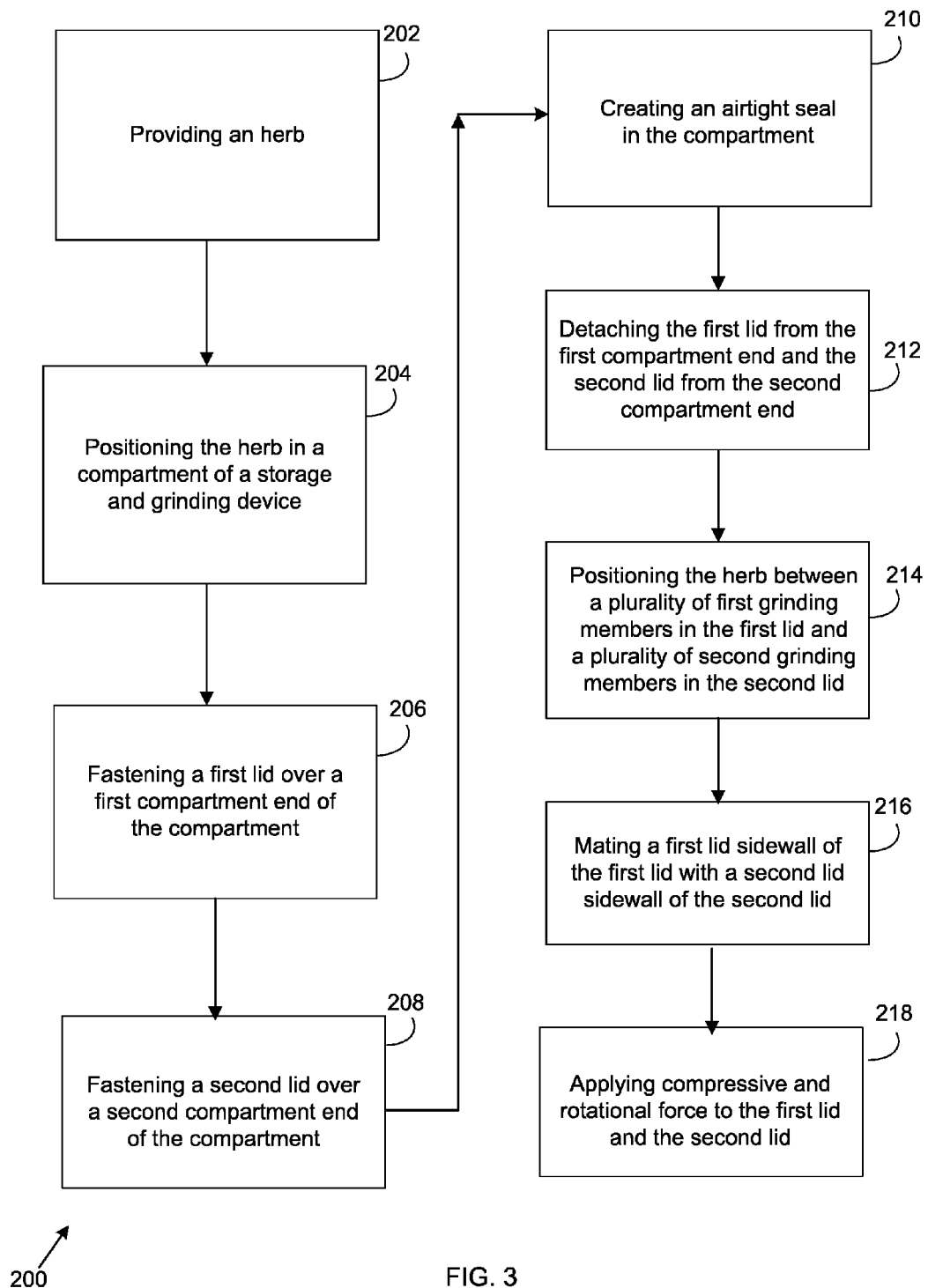
FIG. 3 illustrates a flowchart diagram of an exemplary method for airtight storage and grinding of herbs in a grinding device.

In one embodiment of the present invention presented in FIGS. 1-3, a grinding and storage device 100 and method 200 for airtight storage and grinding of herbs is configured to provide the dual functionality of forming a compartment 102 for storing herbs, and detaching the lids 112, 124 from the compartment 102 to combine into a unitary grinder. Specifically, the device 100 forms an airtight compartment 102 configured to protect the flavor and essence of herbs.

As illustrated in FIG. 1, the compartment 102 has detachable lids 112, 124 that detach from the compartment 102 and join together to form a unitary grinder, effective for grinding, tearing, shredding, and defoliating the herbs. The ground up herbs may then be stored in the compartment 102, and the lids 112, 124 sealed to the compartment 102 to form the airtight seal for the herbs.

In some embodiments, a first lid 112 and a second lid 124 form an airtight seal over a correlating first compartment end 104 and a second compartment end 106. The airtight seal is formed when the first and second lids 112, 124 form a hermetic seal at each end of the compartment 104. 106. The airtight seal enhances the flavor and smell of the herbs by keeping the herbs impervious to gases, and thus retaining the essence of the herbs within the compartment 102.

In one embodiment, at least one barrier (not shown) can position vertically or horizontally inside the compartment 102 to segregate the herbs. The first and second lid 112, 124 can disengage from each end of the compartment 104, 106, and engage each other to form a unitary grinder. Each lid 112, 124 is defined by a first and second lid interior portion 114, 126 having a plurality of first and second grinding members 116, 128. Applying a gentle compressive and rotational force on each lid 112, 124 can be effective for grinding, tearing, shredding, and defoliating the herbs.

In use, the desired amount and type of herbs are placed in the lid interior portions 114, 126, and the first lid 112 is made to mate with the second lid 124. The lids 112, 124 may be magnetized to form a more snug fit. When mated, the lids 112, 124 form a closed, unitary grinder that is a separate component from the airtight sealed compartment 102. From this position, a gentle compressive and rotational pressure may be applied to each lid 112, 124 to engage the first and second grinding members 116, 128 with the herbs for grinding, tearing, shredding, and defoliating the herbs. The ground up herbs may then be replaced back into the compartment 102 and the first and second lids 112, 124 rejoined with their respective ends 104, 106 to reform the airtight seal in the compartment 102.

FIG. 1 references the storage and grinding device 100. The device 100 provides the dual functionality of forming an airtight compartment 102 for storing herbs to protect their flavor and essence, and disassembling into a grinder to grind, tear, and shear the herbs. The device 100 forms an airtight compartment 102 with detachable lids that detach from the compartment 102 and join together to form a unitary grinder, generally for grinding the contents of the compartment 102.

The compartment 102 is defined by a first compartment end 104 and a second compartment end 106 from which extend compartment sidewalls 108 defined by a compartment diameter. The compartment 102 is further defined by a cavity 110. In some embodiments, the cavity 110 of the compartment 102 may include at least one barrier for segregating contents therein. The at least one barrier aligns along the length of the compartment 102, or crosses transversely across the compartment 102. In either case, the herbs may be better segregated. For example, without limitation, a vertical barrier extends along the length of the compartment 102 to divide the compartment 102 in half; with one side to store medical herb, and the other side to store a medication.

In one embodiment, the compartment 102 forms a generally cylindrical shape. However, in other embodiments, the compartment 102 can have myriad shapes and dimensions, including, without limitation, a rectangular tube shape, an elongated triangle shape, a cubical shape, and a spherical shape. In some embodiments, the compartment 102 may be used to store herbs. However, any plant, spice, tobacco, or medicinal compound that is enhanced in an airtight storage, and requires grinding, may be stored in the compartment 102.

In some embodiments, the first end of the compartment 102 detachably mates with a first lid 112, forming an airtight seal therebetween. At least one O-ring (not shown) and a circular depression may enhance the hermetic seal therebetween. Though, in other embodiments, any mating or fastening mechanism may be used between the first lid 112 and the compartment sidewalls 108. The first lid 112 is shaped in substantially the same form as the compartment 102. The first lid 112 comprises a first exterior portion 118.

The first exterior portion 118 has a first lid end 120 from which extends a first lid sidewall 122. The first lid sidewall 122 terminates at a first lid opening, and is defined by a first lid diameter. The first lid diameter is configured to be infinitesimally smaller or larger than the compartment diameter, such that an airtight seal forms between the compartment sidewalls 108 and the first lid sidewall 122 when they are mated. In some embodiments, the first lid sidewall 122 may be magnetized. In one alternative embodiment, the first interior portion 114 and the second interior portion 126 connect via a magnetized grinding element.

As referenced in FIG. 2, the first lid 112 further comprises a first interior portion 114. The first interior portion 114 includes a plurality of first grinding members 116. The first grinding members 116 extend along the first lid sidewall 122 towards the first lid opening. The first grinding members 116 serve to grind, tear, shred, and exfoliate the herbs. Suitable shapes for the first grinding members 116 may include, without limitation, a conical shape, and/or a beveled shape, and/or a rectangular shape, and/or a diamond shape, and/or a confetti shape, and/or a frustoconical shape, and/or a frustoconical pentrahedral shape.

Those skilled in the art will recognize that tearing and deforming the leaves and stems of the herbs releases the essential oils that provide the flavor and essence of the herb. Further, the first grinding members 116 may utilize variously shapes to optimize the grinding effect. For example, a sloped, wider first grinding member is effective for defoliating leaves from a stem, while a sharp first grinding member is more effective for tearing the leaves. Finally, once the herbs are ground up to a desired consistency, the herbs benefit greatly by being stored in an airtight compartment 102. In one embodiment, the at least one O-ring is configured to position on the first interior portion of the first lid. The at least one O-ring enables an airtight closure of the compartment 102.

In some embodiments, the second end of the compartment 102 detachably mates with a second lid 124, forming an airtight seal therebetween. An O-ring and a circular depression may enhance the hermetic seal therebetween. Though, in other embodiments, any mating or fastening mechanism may be used between the second lid 124 and the compartment sidewalls 108. The second lid 124 is shaped in substantially the same form as the compartment 102. The second lid 124 comprises a second exterior portion 130.

The second exterior portion 130 has a second lid end 132 from which extends a second lid sidewall 134. The second lid sidewall 134 terminates at a second lid 124 opening, and is defined by a second lid diameter. The second lid diameter is configured to be infinitesimally smaller or larger than the compartment diameter, such that an airtight seal forms between the compartment sidewalls 108 and the second lid sidewall 134 when they are mated. In some embodiments, the second lid sidewall 134 may be magnetized. The attraction created by the magnetization enables the creation of a snug fit as a compressive and rotational force is applied on the first lid 112 and/or the second lid 124.

The second lid 124 further comprises a second interior portion 126, which forms the interior volume of the second lid 124. This is where the herbs are ground up. The second interior portion 126 includes a plurality of second grinding members 128. The second grinding members 128 extend along the second lid sidewall 134 towards the second lid opening. The second grinding members 128 serve to grind, tear, shred, and exfoliate the herbs. Suitable shapes for the second grinding members 128 may include, without limitation, a conical shape, and/or a beveled shape, and/or a rectangular shape, and/or a diamond shape, and/or a confetti shape, and/or a frustoconical shape, and/or a frustoconical pentrahedral shape.

In some embodiments, the second lid 124 is disposed to detachably mate with the first lid 112. The first and second lids 112, 124 form a snug magnetic attachment that facilitates the exertion of a compressive and rotational force applied onto the first lid 112 and/or the second lid 124. These forces generate a grinding, tearing, shredding, and exfoliating action between the plurality of first grinding members 116 and the plurality of second grinding members 128.

Those skilled in the art will recognize that the size and dimension of the first and second grinding members 128, along with the amount of force applied to both lids 112, 124, are variables that dictate the final composition of the herbs. By being detachable and forming unique mating dispositions with the compartment 102 and each other, the first and second lids 112,124 convert between functions of forming an airtight seal for the compartment 102, and forming a unitary grinder.

FIG. 3 illustrates a flowchart diagram of a method 200 for airtight storage and grinding of herbs in a grinding device 100. The method 200 comprises a first Step 202 of providing an herb. The second end of the compartment 102 detachably mates with a second lid 124, forming an airtight seal therebetween. An O-ring and a circular depression may enhance the hermetic seal therebetween. Though, in other embodiments, any mating or fastening mechanism may be used between the second lid 124 and the compartment sidewalls 108. The second lid 124 is shaped in substantially the same form as the compartment 102.

A Step 204 includes positioning the herb in a compartment of a storage and grinding device. The compartment 102 may be used to store herbs. However, any plant, spice, tobacco, or medicinal compound that is enhanced in an airtight storage, and requires grinding, may be stored in the compartment 102. A next Step 206 may include fastening a first lid 112 over a first compartment end of the compartment. In one embodiment, a threaded surface enables rotational fastening. Though other means may be used for fastening the second lid 114 over the second compartment end. The first lid 112 may include a first interior portion 114. The first interior portion 114 includes a plurality of first grinding members 116. The first grinding members 116 extend along the first lid sidewall 122 towards the first lid opening. The first grinding members 116 serve to grind, tear, shred, and exfoliate the herbs.

The method 200 further includes a Step 208 of fastening a second lid over a second compartment end of the compartment. In one embodiment, a threaded surface enables rotational fastening. Though other means may be used for fastening the second lid 114 over the second compartment end. A Step 210 comprises creating an airtight seal in the compartment. In some embodiments, a Step 212 may include detaching the first lid 112 from the first compartment end and the second lid 114 from the second compartment end. The detachment involves a simple rotation and pulling action that may be performed manually. A Step 214 comprises positioning the herb between a plurality of first grinding members 116 in the first lid 112 and a plurality of second grinding members 118 in the second lid 114.

A further Step 216 comprises mating a first lid sidewall 122 of the first lid with a second lid sidewall 134 of the second lid. The sidewalls 122, 134 may be magnetized to form a snug fit between the first and second lids 112, 124. The mating includes sealing the first lid 112 with the first compartment end 104, and sealing the second lid 124 over the second compartment end 106. The first and second lid sidewall 122, 134 terminate at the correlating first and second lid opening, and are defined by a respective first and second lid diameter. The first and second lid diameter is configured to be infinitesimally smaller or larger than the compartment diameter, such that an airtight seal forms between the compartment sidewalls 108 and the first and second lid sidewall 122, 134 when they mate. The O-ring and circular depression may enhance the hermetic seal therebetween.

A final Step 218 comprises applying compressive and rotational force to the first lid and the second lid, the compressive and rotational force configured to generate a grinding action between the plurality of first grinding members and the plurality of second grinding members. This may involve a simple twisting motion with the wrists. This is the actual grinding of the herbs. A plurality of first and second grinding members 116, 128, correlating to their respective lids 112, 124 serve to grind, tear, shred, and exfoliate the herbs. Another step comprises placing the ground up herbs in the compartment 102. The herbs have been defoliated, shredded, and ground up at this step, and thus may benefit by maintaining flavor and odor in an airtight environment.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What I claim is:

1. A combination storage and grinding device, the device comprising:
   a compartment defined by a first compartment end and a second compartment end from which extend compartment sidewalls defined by a compartment diameter, the compartment further defined by a cavity;
   a first lid defined by a first interior portion and a first exterior portion,
   the first interior portion having a plurality of first grinding members,
   the first exterior portion having a first lid end from which extends a first lid sidewall, the first lid sidewall defined by a first lid diameter, the first lid diameter configured to be infinitesimally smaller or larger than the compartment diameter,
   the first lid disposed to detachably mate with the first compartment end, wherein an airtight seal forms between the compartment sidewalls and the first lid sidewall; and
   a second lid defined by a second interior portion and a second exterior portion,
   the second interior portion having a plurality of second grinding members,
   the second exterior portion having a second lid end from which extends a second lid sidewall, the second lid sidewall defined by a second lid diameter, the second lid diameter configured to be infinitesimally smaller or larger than the compartment diameter,
   the second lid disposed to detachably mate with the second compartment end, wherein an airtight seal forms between the compartment sidewalls and the first lid sidewall,
   the second lid further disposed to detachably mate with the first lid, wherein a compressive and rotational force applied to the first lid and the second lid generates a grinding action between the plurality of first grinding members and the plurality of second grinding members.

2. The device of claim 1, wherein the compartment has a generally cylindrical shape.

3. The device of claim 1, wherein the shape of the first lid and the second lid include at least one member selected from the group consisting of: a cylindrical shape, an elongated tetrahedron, and an elongated hexahedron.

4. The device of claim 1, wherein the shapes of the plurality of first grinding members include at least one member selected from the group consisting of: a cylindrical shape, a conical shape, a beveled shape, a rectangular shape, a diamond shape, a confetti shape, a frustoconical shape, and a frustoconical pentrahedral shape.

5. The device of claim 1, wherein the shapes of the plurality of second grinding members include at least one member selected from the group consisting of: a cylindrical shape, a conical shape, a beveled shape, a rectangular shape, a diamond shape, a confetti shape, a frustoconical shape, and a frustoconical pentrahedral shape.

6. The device of claim 1, wherein the first lid diameter is configured to be infinitesimally smaller or larger than the second lid diameter for enabling a snug fit while mated.

7. The device of claim 1, wherein the first lid sidewall and the second lid sidewall are magnetized.

8. The device of claim 7, wherein the attraction formed by the magnetization of the first lid sidewall and the second lid sidewall enables the creation of a snug fit as a compressive and rotational force is applied on the first lid and/or the second lid.

9. The device of claim 1, wherein the cavity of the compartment comprises at least one barrier.

10. The device of claim 9, wherein the barrier is configured to separate contents in the cavity of the compartment.

11. The device of claim 1, further including at least one O-ring, the at least one O-ring configured to position on the first interior portion of the first lid and the second interior portion of the second lid, the at least one O-ring further configured to enable an airtight closure of the compartment.

12. A combination storage and grinding device, the device comprising:
   a compartment defined by a first compartment end and a second compartment end from which extend compartment sidewalls defined by a compartment diameter, the compartment further defined by a cavity, the compartment further defined by a barrier, the barrier configured to segregate the cavity of the compartment;
   a first lid defined by a first interior portion and a first exterior portion,
   the first interior portion having a plurality of first grinding members,
   the first exterior portion having a first lid end from which extends a first lid sidewall, the first lid sidewall defined by a first lid diameter, the first lid diameter configured to be infinitesimally smaller or larger than the compartment diameter, the first lid sidewall configured to be magnetized;
   the first lid disposed to detachably mate with the first compartment end, wherein an airtight seal forms between the compartment sidewalls and the first lid sidewall;
   a second lid defined by a second interior portion and a second exterior portion,
   the second interior portion having a plurality of second grinding members,
   the second exterior portion having a second lid end from which extends a second lid sidewall, the second lid sidewall defined by a second lid diameter, the second lid diameter configured to be infinitesimally smaller or larger than the compartment diameter, the second lid sidewall configured to be magnetized,
   the second lid disposed to detachably mate with the second compartment end, wherein an airtight seal forms between the compartment sidewalls and the first lid sidewall,
   the second lid further disposed to detachably mate with the first lid, wherein a compressive and rotational force applied to the first lid and the second lid generates a grinding action between the plurality of first grinding members and the plurality of second grinding members; and
   at least one O-ring, the at least one O-ring configured to position on the first interior portion of the first lid and the second interior portion of the second lid, the at least one O-ring further configured to enable an airtight closure of the compartment.

13. The device of claim 12, wherein the compartment has a generally cylindrical shape.

14. The device of claim 12, wherein the shape of the first lid and the second lid include at least one member selected from the group consisting of: a cylindrical shape, an elongated tetrahedron, and an elongated hexahedron.

15. The device of claim 12, wherein the shapes of the plurality of first grinding members and the plurality of second grinding members include at least one member selected from the group consisting of: a conical shape, a beveled shape, a rectangular shape, a diamond shape, a confetti shape, a frustoconical shape, and a frustoconical pentrahedral shape.

16. The device of claim 12, wherein the first lid diameter is configured to be infinitesimally smaller or larger than the second lid diameter for enabling a snug fit while mated.

17. The device of claim 12, wherein the material of the device includes at least one member selected from the group consisting of: metal, wood, ceramic, and a rigid polymer.

18. A method for airtight storage and grinding of herbs, the method comprising:
provide herb;
Providing a storage and grinding device
positioning the herb in a compartment of the storage and grinding device;
fastening a first lid over a first compartment end of the compartment;
fastening a second lid over a second compartment end of the compartment;
creating an airtight seal in the compartment;
detaching the first lid from the first compartment end and the second lid from the second compartment end;
positioning the herb between a plurality of first grinding members in the first lid and a plurality of second grinding members in the second lid;
mating a first lid sidewall of the first lid with a second lid sidewall of the second lid; and
applying compressive and rotational force to the first lid and the second lid, the compressive and rotational force configured to generate a grinding action between the plurality of first grinding members and the plurality of second grinding members.

19. The method of claim 18, wherein the compartment has a generally cylindrical shape.

20. The method of claim 18, wherein the shape of the first lid and the second lid include at least one member selected from the group consisting of: a cylindrical shape, an elongated tetrahedron, and an elongated hexahedron.

* * * * *